United States Patent [19]

Inamura

[11] Patent Number: 5,095,867
[45] Date of Patent: Mar. 17, 1992

[54] POSITIONING DEVICE FOR A GASKET
[75] Inventor: Susumu Inamura, Tokyo, Japan
[73] Assignee: Ishikawa Gasket Co., Ltd., Tokyo, Japan
[21] Appl. No.: 658,029
[22] Filed: Feb. 20, 1991
[51] Int. Cl.⁵ ............................................ F02F 11/00
[52] U.S. Cl. ............................... 123/193.3; 123/195 R; 123/41.74; 277/235 B
[58] Field of Search ........ 123/193 C, 193 CH, 193 H, 123/41.74, 195 R; 277/235 B, 189

[56] References Cited
U.S. PATENT DOCUMENTS

| | | | |
|---|---|---|---|
| 2,679,241 | 5/1954 | Dickson | 123/193 CH |
| 2,771,869 | 11/1956 | Leach | 123/193 CH |
| 2,771,870 | 11/1956 | Hutchison | 123/193 CH |
| 4,653,761 | 3/1987 | Baugh et al. | 123/193 CH |

Primary Examiner—E. Rollins Cross
Assistant Examiner—Weilun Lo
Attorney, Agent, or Firm—Kanesaka and Takeuchi

[57] ABSTRACT

A positioning device of the invention is attached to an engine part for installing a gasket thereon. The positioning device includes a positioning pin with an annular depression adjacent a top end thereof, and a top plate fixed to the top end of the positioning pin. A space is defined by the top plate and the annular depression. When the gasket is moved on the engine part, the gasket is held in the space and is blocked by the top plate to prevent accidental disengagement of the gasket from the engine part.

6 Claims, 1 Drawing Sheet

POSITIONING DEVICE FOR A GASKET

BACKGROUND OF THE INVENTION AND RELATED ART STATEMENT

The present invention relates to a positioning device or dowel attached to an engine block of an internal combustion engine for setting a location of a gasket.

When engine parts are assembled with a gasket, a lower engine part is placed on a floor or a platform. Since the lower engine part is provided with dowels for setting a location of the gasket, the gasket is placed on the lower engine part so that the dowels are located in dowel holes of the gasket. Then, an upper engine part is placed above the gasket, and the two engine parts are tightened together by bolts.

In order to easily assemble the gasket on the lower engine part, the diameter or size of the dowel hole of the gasket is slightly larger than the diameter of the dowel. Therefore, in case the lower engine part with the gasket is shaken, the gasket may disengage from the lower engine part.

Especially, in a V engine, gasket attaching surfaces of the lower engine part inclines downwardly. Therefore, even if gaskets are installed on the gasket attaching surfaces of the lower engine part, the gaskets are liable to disengage from the lower engine part.

In an automatic assembly line of engines, engines are continuously or consecutively moved. When the upper engine part is assembled on the lower engine part with the gasket, in some cases, the engine parts are stopped for a while for assembly.

In the V engine, in case the lower engine part with the gasket is consecutively moved and stopped, the gasket may fall from the lower engine part. In the automatic assembly line, it is troublesome to check the gasket in each engine, and install a gasket in case no gasket is placed on the lower engine part.

In a positioning pin or dowel, there has not been made any device for preventing a gasket from disengaging from an engine part.

Accordingly, one object of the invention is to provide a positioning device for preventing accidental disengagement of a gasket from an engine part as well as exactly setting a location of the gasket.

Another object of the invention is to provide a positioning device as stated above, to which a gasket can be easily installed.

A further object of the invention is to provide a positioning device as stated above, which can be easily and economically manufactured.

Further objects and advantages of the invention will be apparent from the following description of the invention.

SUMMARY OF THE INVENTION

A positioning device of the present invention is attached to an engine part, i.e. engine block, of an internal combustion engine for setting a location of a gasket. Generally, at least two positioning devices are attached to the engine part.

The positioning device of the invention includes a positioning pin attached to the engine part to project outwardly from the engine part, and a top plate fixed to a top end of the positioning pin. The positioning pin includes an annular depression adjacent to the top end thereof. Since the top plate extends laterally and outwardly from the top end of the positioning pin, a space is defined around the depression.

When the gasket is accidentally moved on the engine part, a portion of the gasket around the positioning hole is held in the space and is blocked by the top plate to prevent the gasket from accidentally disengaging from the engine part.

When a gasket is installed on the engine part, the positioning holes of the gasket engage the positioning pins on the engine part. When the gasket thus installed abuts against the engine part, the gasket is located in a proper position. When the gasket is accidentally moved outwardly, edges of the gasket around the positioning holes are blocked by the top plate and is retained inside the space or annular depression of the positioning pins to prevent accidental disengagement of the gasket from the engine part.

Especially, in a V type engine, the gasket attaching portion of the engine inclines downwardly. Therefore, when the gasket is slightly moved, the gasket is liable to disengage from the positioning pins. In the present invention, the edge around the positioning hole of the gasket is located in the space or annular depression of the positioning pin when the gasket is moved around the position pin, and the movement of the gasket is restrained by the top plate. Therefore, the gasket is securely retained on the engine part.

The top plate has resiliency and is made larger than the positioning hole of the gasket. Therefore, the top plate can pass through the positioning hole but is prevented from disengaging therefrom.

Also, the top plate may be at least partly bent downwardly to facilitate positioning of the gasket over the positioning device when installed. Also, the top plate may have a plurality of slits at an outer periphery so that the top plate can easily pass through the positioning hole of the gasket.

DETAILED DESCRIPTION OF PREFERRED EMBODIMENTS

Figure 1:
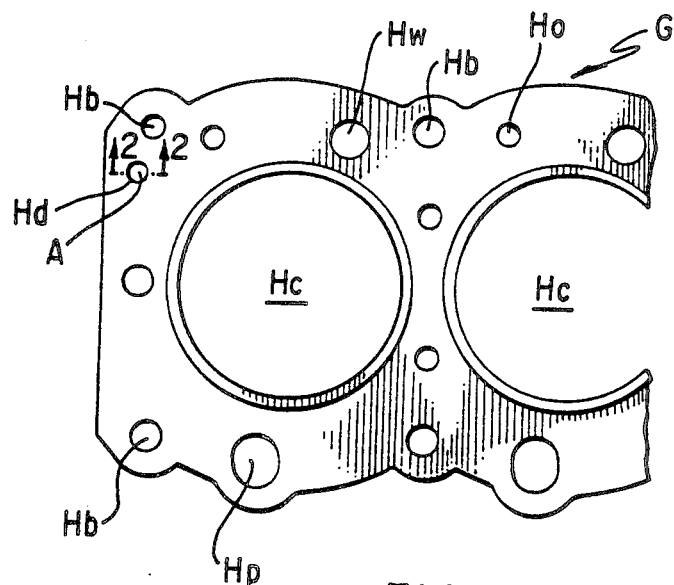
FIG. 1 is a plan view of a part of a gasket installed on a cylinder block.

FIG. 1 shows a part of a steel laminate gasket G installed on a cylinder block X with a positioning device A of the present invention. The gasket G is a cylinder head gasket, and includes a plurality of cylinder bores Hc, water holes Hw, oil holes Ho, bolt holes Hb and push rod holes Hp, as in the conventional gasket.

The gasket G includes two positioning holes Hd (one is shown in FIG. 1). When the gasket G is installed on the cylinder block X, the positioning devices A attached to the cylinder block X are located in the positioning holes Hd of the gasket G to precisely locate the gasket G onto the cylinder block X. The positioning devices A may be used to determine a position of a cylinder head relative to the cylinder block X.

Figure 2:
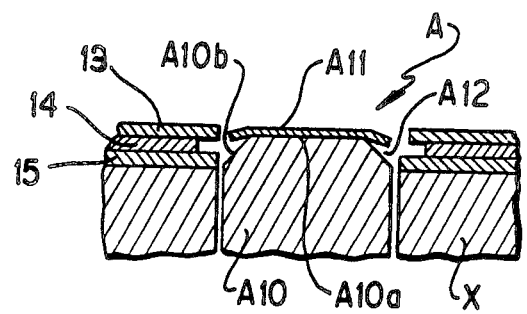
FIG. 2 is an enlarged section view taken along line 2—2 in FIG. 1, wherein a first embodiment of a positioning device of the invention is shown.
Figure 3:
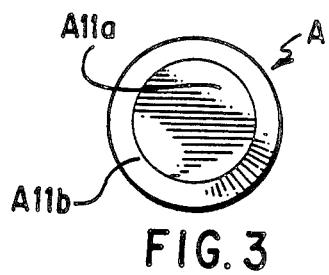
FIG. 3 is a plan view of the positioning device of the first embodiment of the invention.

As shown in FIGS. 2 and 3, the positioning device A is formed of a columnar positioning pin A10 and a top plate A11. The columnar pin A10 is fixed to the cylinder block X at a lower part thereof, and projects upwardly from an upper surface of the cylinder block X. The columnar pin A10 includes a top end A10a and a tapered edge A10b around the top end A10a.

The top plate A11 is made of a metal plate with resiliency, and includes an inner portion A11a and an outer portion A11b. The outer diameter of the outer portion A11b is substantially the same as that of the columnar pin A10. The outer portion A11b inclines slightly downwardly from the inner portion A11a, so that when the gasket G is installed on the cylinder block X, the gasket G can be easily aligned with the positioning device A.

The inner portion A11a is fixed to the top end A10a of the pin A10 by spot welding. Consequently, an annular space A12 is defined by the tapered edge A10b and the top plate A11.

When the positioning device A is installed on the cylinder block X, the lower part of the pin A10 is attached or fixed to the cylinder block X in a conventional manner. The upper part of the pin A10 projects outwardly from an upper surface of the cylinder block X.

In the embodiment as shown in Figs. 1-3, the gasket G is a steel laminate gasket including an upper plate 13, a middle plate 14 and a lower plate 15. The size of a hole in the lower plate 15 is substantially the same as the positioning pin A10. Therefore, when the hole of the lower plate 15 engages the positioning pin A10, the gasket G is located in a proper position.

Also, the width or height of the space A12 is made larger than the thicknesses of the middle and lower plates 14, 15. Accordingly, in case the gasket G slips out of the positioning device A, one of the plates 14, 15, in particular the lower plate 15 in FIG. 2, engages the space A12.

When the gasket G is installed on the cylinder block X, the positioning hole Hd of the gasket G is aligned with the positioning device A, and the gasket G is placed above the cylinder block X so that the positioning hole Hd engages the positioning device A. Since the top plate A11 is slightly bent downwardly, the gasket G can be installed easily.

In case the cylinder block X with the gasket G thus installed is transferred on an assembly line and is stopped, the gasket G may jump up from the cylinder block X. At this time, since the positioning device A is provided with the space A12, the lower plate 15 of the gasket G enters the space A12 and is blocked by the top plate A11. Accordingly, the gasket G is prevented from disengagement from the positioning device A.

Figure 4:
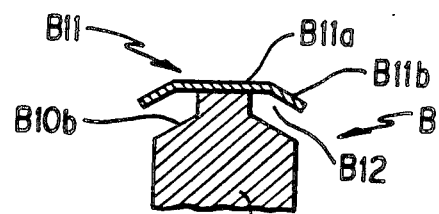
FIG. 4 is a section view of a second embodiment of a positioning device of the invention.

FIG. 4 shows a second embodiment B of a positioning device of the invention. The positioning device B includes a positioning pin B10 with an annular step B10b at an upper end thereof, and a top plate B11 fixed to the positioning pin B10. In the top plate B11, an outer portion B11b is bent relative to an inner portion B11a. Also, the diameter of the top plate B11 is slightly larger than the diameter of the positioning pin B10 and the positioning hole of the gasket.

When a gasket G is installed in the positioning device B attached to the cylinder block, after the gasket G is placed on the cylinder block, the gasket G is strongly pushed against the cylinder block. Consequently, the top plate B11 bends slightly into a space B12, and the top plate B11 passes through the positioning hole Hd.

In the positioning device B, even if the gasket G moves on the cylinder block, the gasket G does not disengage from the positioning device B because of the top plate B11 larger than the positioning hole Hd. The position of the gasket G is determined by the positioning pin B10. The gasket G is securely positioned on the cylinder block X.

Figure 5:
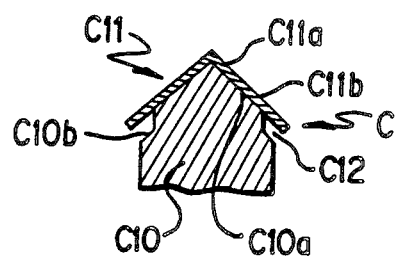
FIG. 5 is a section view of a third embodiment of a positioning device of the invention.
Figure 6:
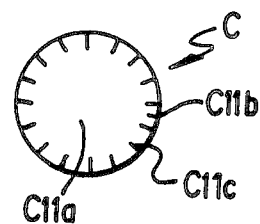
FIG. 6 is a plan view of the positioning device of the third embodiment of the invention.

FIGS. 5 and 6 show a third embodiment C of the positioning device of the invention. The positioning device C includes a positioning pin C10, and a top plate C11 fixed to the positioning pin C10.

The positioning pin C10 has a conical top end C10a, and an annular step C10b. The top plate C11 is also made conical and larger than the positioning pin C10. The top plate C11 includes an inner portion C11a fixed to the top end C10a and an outer portion C11b extending outside the top end C10a to form a space C12 toqether with the annular step C10b. Also, the outer portion C11b includes a plurality of slits C11c to facilitate bending of the outer portion C11b.

In the positioning device C, since the positioning device C has a conical top end, the gasket G can be easily positioned on the cylinder block. Also, since the top plate C11 includes the slits C11c, the gasket G can be easily engaged with the positioning pin when installed. The gasket G does not disengage from the positioning device C even if the gasket G moves on the cylinder block.

In the present invention, the top plate is welded to the positioning pin. But the top plate may be glued onto the positioning pin or may have a cap press-fitting onto the positioning pin.

In accordance with the present invention, the positioning device attached to the engine part is provided with a space under the top plate. When the gasket accidentally slips out of the positioning pin, a part of the gasket is at least located in the space and is blocked by the top plate. Accordingly, accidental disengagement of the gasket from the engine part is securely prevented.

While the invention has been explained with reference to the specific embodiments of the invention, the explanation is illustrative, and the invention is limited only by the appended claims.

What is claimed is:

1. A positioning device adapted to be attached to an engine part for installing a gasket on the engine part, said gasket having a positioning hole engaging the positioning device, said positioning device comprising, a positioning pin attached to the engine part to extend outwardly from the engine part, said positioning pin having a top end, and an annular depression formed adjacent the top end thereof, and a top plate fixed to the top end of the positioning pin, said plate extending outwardly from the top end to form a space together with the depression so that when the gasket is accidentally moved on the engine part, a portion of the gasket around the positioning hole is held in the space and is blocked by the top plate to prevent accidental disengagement of the gasket from the engine part.

2. A positioning device according to claim 1, wherein said top plate has resiliency an is made larger than the positioning hole of the gasket so that the top plate can pass through the positioning hole of the gasket but prevents the gasket from disengaging from the positioning device.

3. A positioning device according to claim 2, wherein said top plate is at least partly bent downwardly to facilitate positioning of the gasket over the positioning device when installed.

4. A positioning device according to claim 2, wherein said top plate has a plurality of slits at an outer periphery thereto so that the top plate can easily pass through the positioning hole of the gasket.

5. A positioning device according to claim 1, wherein said annular depression is in the form of a tapered edge around the top end thereof.

6. A positioning device according to claim 1, wherein said top end is tapered to have a conical surface at the top thereof.

* * * * *